United States Patent [19]

Hawkins

[11] 4,266,221

[45] May 5, 1981

[54] PERSONNEL ALARM CIRCUIT FOR INDUSTRIAL MACHINERY

[76] Inventor: J. C. Hawkins, P.O. Box 1348, Wise, Va. 24293

[21] Appl. No.: 77,322

[22] Filed: Sep. 20, 1979

[51] Int. Cl.³ .............................................. G08B 21/00
[52] U.S. Cl. .............................. 340/679; 192/129 A; 307/191.4; 340/309.1; 361/29
[58] Field of Search .................. 340/679, 309.1, 309.4; 361/29, 195; 307/141.4; 192/129 A

[56] References Cited

U.S. PATENT DOCUMENTS 3,631,447  12/1971  Sulat et al. ........................... 340/679
4,110,742  8/1978  Hawkins ............................. 340/309.4

Primary Examiner—Glen R. Swann, III
Attorney, Agent, or Firm—Kemon & Estabrook

[57] ABSTRACT

An alarm circuit is interlocked with the start circuit of power driven industrial machinery such as a coal tipple so that before the machinery can be started, an alarm must be energized for a predetermined time to alert personnel that the machine is about to start. In the event that the machinery is not started within a predetermined time after termination of the alarm, or in the event that the alarm has not actually sounded, the whole cycle must be repeated.

3 Claims, 1 Drawing Figure

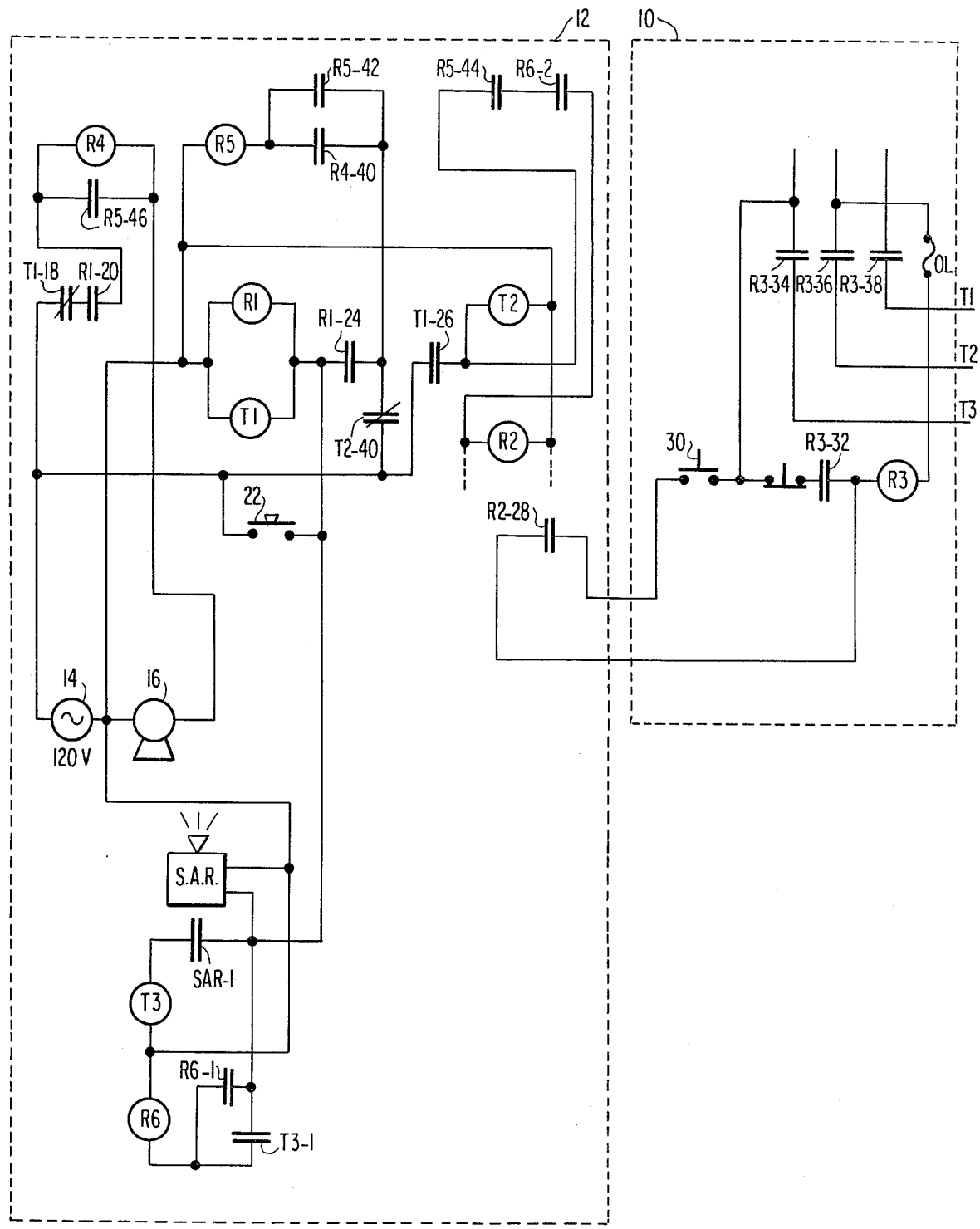

PERSONNEL ALARM CIRCUIT FOR INDUSTRIAL MACHINERY

BACKGROUND OF THE INVENTION

In my prior U.S. Pat. No. 4,110,742, an alarm circuit is disclosed for use in combination with industrial machinery. The example given is the coal mining industry where coal tipples employ elongated conveyor belts and the starting controls are in a location where the operator cannot see the entire belt from the control position. The system disclosed in that patent is one which prevents the startup of machinery of that type unless an alarm circuit has first been actuated to sound an alarm for a predetermined period of time to alert all personnel in the area of the machinery that it is about to start. The alarm is so arranged that if the machinery does not start within a predetermined time following termination of the alarm, the entire cycle must be restarted.

BRIEF SUMMARY OF THE INVENTION

The present invention is an improvement on that disclosed in my prior patent in that a further safety factor is introduced into the system. The additional safety factor is in the form of a further interlock which prevents startup of the machinery until the alarm has actually sounded for a predetermined time. In other words, not only must the alarm circuit be energized for a given warning period as fully described in my prior U.S. Pat. No. 4,110,742, but the alarm itself must actually be audible over that period before the start circuit for the machinery can be enabled by the operator.

BRIEF DESCRIPTION OF THE DRAWING

The single FIGURE of the drawing is a schematic diagram of a preferred embodiment of the present invention.

DETAILED DESCRIPTION OF THE DRAWING

Any conventional starting arrangement for example for a three phase motor is indicated generally by the reference numeral 10. An alarm and timing circuit to be interlocked with the start circuit 10 is indicated generally at 12. The alarm circuit 12 may conveniently be energized from a single phase 120 volt source indicated at 14. The actual alarm schematically indicated as a horn 16 is connected to the supply through two sets of contacts one normally open and the other normally closed. The normally closed contacts T1-18 are controlled by a time delay relay T1 and the normally open contacts are R1-20 controlled by relay R1. A manual switch 22 when momentarilly closed, energized both R1 and T1 and locks them in the energized state through a set of holding contacts R1-24 controlled by R1. This also closes the contacts R1-20 which completes a circuit through the warning horn 16 via the relay R4. Energization of R4 closes normally open contacts R4-40 to energize a further relay R5 which locks in through its own normally open contacts R5-42. This also closes normally open contacts R5-44 and R5-46. When R5-46 are closed, R4 is shunted and it will therefore drop out but the circuit through the horn remains complete. As a fail-safe provision, in the event there is an open circuit in the alarm itself, R4 cannot be energized thus preventing energization of R5, which in turn prevents energization of R2 to block start-up of the equipment by preventing enablement of the start circuit 10. The time delay relay T1 after a predetermined period of time will open its contacts T1-18 to terminate the alarm even though relay R1 remains energized through its holding contacts R1-24. A further set of contacts T1-26 are normally open and are closed by relay T1 at the same time that the contacts T1-18 are opened. In my prior patent, closing of contacts T1-26 is effective to energize the second pair of relays T2 and R2. In the present circuit, however, R2 is not energized merely by the closing of contact T1-26 because an additional set of contacts R6-2 has been incorporated in the circuit and these must be closed by the sound operated relay before R-2 can be energized to enable the start circuit 10. As in my prior patent, the time delay relay T2 runs for a predetermined time and after that time opens its normally closed contact T2-40 which drops out relays R1 and T1 and returns the entire alarm circuit 12 to its original condition. Unless the machinery has started therefore within the time period set by relay T2 it cannot again be started without first sounding the alarm 16 for the same period as the original. Actual sounding of the horn operates to energize the sound operated relay SAR to close its normally open contacts SAR-1 and start timing relay T3 running. This timing relay may be set for example for 10 seconds, after which time it closes its contacts T3-1 to energize relay R6. As soon as relay R6 has been energized, it closes its contacts R6-1 and R6-2 and only then is the relay R2 energized to enable the start circuit by closing normally open contacts R2-28. The operator may then start up the machinery by momentarily depressing the start button 30 to energize R3 which then locks in through its own holding contacts R3-32 and also closes the contacts R3-34, R3-36 and R3-38 to supply three phase power to the machinery in question.

Preferably, the sound operated relay SAR is centrally located with respect to the area surrounding the machinery in question. Unless this relay is actuated by sound from the horn, 16, the starting circuit 10 is never enabled because the relay R2 cannot be energized until the relay R6 has closed its contacts R6-2.

Thus, if for any reason the horn 16 is not actually sounded, the machinery cannot be started and therefore an additional safety factor is incorporated in the circuitry for the same general purpose shown in my prior U.S. Pat. No. 4,110,742.

While a preferred embodiment of the present invention has been herein shown and disclosed, applicant claims the benefit of a full range of equivalents within the scope of the appended claims.

I claim:

1. A safety circuit for use in connection with power driven industrial machinery comprising:
   a start circuit for the machinery;
   alarm means;
   means interlocked with said start circuit disabling operation thereof until said alarm means has been energized for a predetermined time;
   means responsive to actual operation of said alarm, interlocked with said start circuit disabling operation thereof until said alarm means has actually operated for a predetermined time;
   manual means for energizing said alarm;
   means in circuit with said alarm for terminating said alarm after a predetermined time;
   means responsive to termination of said alarm for enabling said start circuit; and means for disabling said start circuit in the event that the equipment with which it is associated does not start within a predetermined time following termination of said alarm.

2. A safety circuit as defined by claim 1 and including fail safe means connected to said alarm means and responsive to open circuit conditions in said alarm means for preventing enabling of said start circuit.

3. A safety circuit as defined by claim 1 in which said means responsive to actual operation of said alarm is a sound powered relay.

* * * * *